United States Patent [19]

Tate

[11] Patent Number: 4,679,158

[45] Date of Patent: Jul. 7, 1987

[54] AUTOMATIC MIRROR ROTATING SYSTEM

[76] Inventor: William J. Tate, 132 Filbert Ave., Sausalito, Calif. 94965

[21] Appl. No.: 714,710

[22] Filed: Mar. 21, 1985

[51] Int. Cl.[4] .............................................. G02D 5/08
[52] U.S. Cl. ................................. 364/559; 250/224; 364/605
[58] Field of Search .................. 350/605, 606, 559; 250/215, 224, 578, 234

[56] References Cited

U.S. PATENT DOCUMENTS 3,749,480 7/1973 De Witt et al. ..................... 350/605

FOREIGN PATENT DOCUMENTS

0145451 11/1984 Japan .................................. 350/605

Primary Examiner—Arthur G. Evans
Attorney, Agent, or Firm—Flehr, Hohbach, Test, Albrittin & Herbert

[57] ABSTRACT

A mirror positioning system (230) for a towed and a towing vehicle (102, 32) has a mirror (34) pivotally mounted on a support (36) for movement about a vertical axis. Stepping motor (60) pivots the mirror (34) in response to control signals from microprocessor (240). The microprocessor (240) is configured to oscillate the mirror (34) in a pivoting scanning motion. A control panel (246) is connected to enter user commands and information in the microprocessor (240). Steering wheel position sensor (232) and wheel motion sensor (234) supply input signals to the microprocessor (240) to determine an angle between the towed and towing vehicles (102, 32). This angle determines the proper position of mirror (34) for rear vision.

14 Claims, 18 Drawing Figures

AUTOMATIC MIRROR ROTATING SYSTEM

BACKGROUND OF THE INVENTION

1. Field of the Invention

This invention relates to an improved form of a system for automatic positioning of a mirror mounted on a towing vehicle for effective rear vision at different angles between the towing vehicle and a towed vehicle. More particularly, it relates to such a system which is easily installed on a variety of towing and towed vehicle configurations and which is capable of properly positioning the mirror automatically under a variety of vehicle operating conditions. Most especially, it relates to such a system that may be easily installed on existing equipment without extensive modification to accept the system.

2. Description of the Prior Art

A right rear view mirror mounted outside of a tractor cab is usually positioned so that, as the driver looks out the right window, his line of reflected sight is directed toward the right rear edge of a trailer being pulled by the tractor. When the tractor is turned relative to the trailer, this direct line of sight is lost. The left mirror is affected in a similar way.

Most mirrors are constructed with a width of about 6 to 7 inches, giving the driver a view of an area including a region slightly forward of the rear edge of the trailer and slightly beyond the rear edge, so that the driver will have a fairly wide view of vehicles traveling behind the tractor.

When the driver negotiates a right turn of 45 degrees, the driver's line of sight is directed by the mirror to a point well forward of the right rear end of the trailer. For a 45 degree turn, this line of sight is very near the front of the trailer. For the driver to see the usual region near the rear of the trailer, the mirror needs to be rotated in a counterclockwise direction. The extent of rotation for different turns varies on the basis of turn angle, trailer length, trailer combinations, axle positions, and similar variables.

A good view of the vehicle rear is often important. When backing into a loading or unloading area, such as a dock, the tractor is almost always at some angle relative to the trailer for the docking maneuver. The backing maneuver must be fairly accurate, both in the distance from the dock and the lateral position of the trailer adjacent to the material to be loaded or a particular door in a warehouse. At any angle of the tractor to the trailer, the driver should be able to see the trailer rear well to position the trailer as required. Since the rear view mirrors on tractors are presently stationary, it is often necessary for the driver to leave the vehicle, get additional assistance to perform the parking maneuver, and/or use trial and error in several attempts. Such maneuvering may result in damage to the vehicle, the dock, or parked vehicles.

The docking procedure is one of the most difficult for the beginning driver to learn. It takes considerable time for the driver to learn the necessary "feel" for his location relative to the dock when it is not in the line of sight. Also, this "feel" will change from one tractor-trailer to another.

Rearward vision at different tractor-trailer angles is also important when the tractor-trailer must negotiate a turn on a narrow street or other confined area due to parked cars or traffic. When a tractor-trailer turns a corner too sharply, the rear trailer wheels will often pass over the street curb. Such turns can be properly carried out with good rear vision. Passing the rear wheels over the curb is dangerous for a number of reasons, including pedestrian injury or apprehension, tire damage and load damage.

A variety of systems for rotating the rear view mirrors to improve rear vision have been proposed. These systems use mechanical, electrical or combined mechanical and electrical means to rotate the rear view mirror remotely from inside the vehicle, either automatically or under driver control. None of the prior art automatic approaches have been successful and/or have serious shortcomings. Such systems are disclosed in the following issued U.S. patents:

U.S. Pat. No. 3,761,164, issued Sept. 25, 1973 to McKee et al., discloses an automatic mirror rotation system comprising a mechanical linkage attached between the steering linkage of a tractor and the rear view mirror. This mechanism does not take the relative position of the tractor and the trailer into consideration.

U.S. Pat. No. 3,749,480, issued July 31, 1973 to De Witt et al., discloses a system incorporating a mechanical sensing device adjacent the "fifth wheel" to sense relative motion between a tractor and trailer and analog electrical circuitry connected to rotate the rear view mirror on the basis of sensor inputs. This patent contains an extensive discussion of the tradeoffs of different measuring points for relative movement between the tractor and the trailer, including the steering column. While this system is capable of handling variation in the location of the rear wheels of the trailer, it is not sufficiently flexible to handle the wide variations encountered with different rigs that may be attached to a tractor in commercial hauling. The linkage connected to position the mirror is also cumbersome and prone to damage.

U.S. Pat. No. 3,469,901, issued Sept. 30, 1969 to Cook et al., discloses a system in which a plurality of switch contacts are located adjacent to the "fifth wheel" for operating a coil in a three coil relay. Energization of each coil progressively rotates the rear view mirror a given number of degrees. This system requires each trailer to be modified to provide contacts mounted on the trailer underside to cooperate with contacts adjacent the "fifth wheel". Attachment of the tractor to different trailers and maintenance are difficult. This system is useful only with specially modified trailers.

U.S. Pat. No. 2,988,957, issued June 20, 1961 to Kotora, discloses a system with a rear view mirror adjustment which operates from the steering column. This device operates on the turning of the wheels alone and has no relation to the angle of a towed vehicle.

U.S. Pat. No. 2,854,892, issued Oct. 7, 1958 to Stark provides a rear view mirror assembly for a tractor-trailer in which the adjustment of the mirror is accomplished by a linkage to the wheels. This device is difficult to attach, adjust, and reach. As in the case of the other systems tied to steering, it is not necessarily desirable to have the rear view mirror turn each time the wheels turn. The desire is to have the device function relative to the trailer, not just one wheel of the tractor.

The following additional issued U.S. patents disclose various mechanical mirror rotating systems: U.S. Pat. No. 3,950,080, issued Apr. 13, 1976 to McKee et al.; U.S. Pat. No. 3,741,633, issued June 26, 1973 to Haley; U.S. Pat. Nos. 3,640,609 and 3,640,608, both issued Feb. 8, 1972 to McKee et al., U.S. Pat. No. 3,476,464, issued Nov. 4, 1969 to Clark; U.S. Pat. No. 3,208,343, issued Sept. 28, 1965 to Prochnow; U.S. Pat. No. 3,166,630, issued Jan. 19, 1965 to Esslinger.

Thus, while the art pertaining to such mirror positioning systems is a well developed one, no prior art device has been successful because the mechanical linkage systems of such devices are too costly, too difficult to install, and too difficult to adjust for varying circumstances, such as different size trailers, combinations of trailers, and movable axles on tractors and trailers.

SUMMARY OF THE INVENTION

Accordingly, it is an object of this invention to provide an automatic mirror adjusting system for towing and towed vehicles which will accurately position the mirror on the basis of relative movement between the towed and towing vehicles and which is capable of adjusting for wide variations encountered in towed and towing vehicle combinations employed in commercial hauling.

It is another object of the invention to provide a mirror rotating system which will scan a predetermined field of view.

It is another object of the invention to provide an improved retractable cable sensor for an automatic mirror rotating system.

It is still another object of the invention to provide an automatic mirror rotating system utilizing transmitted and received electromagnetic waves in a sensor to determine relative position between a towed and a towing vehicle.

It is a further object of the invention to provide an automatic mirror rotating system in which steering position and rotational wheel movement of a towing vehicle are sensed in order to determine relative angle between the towing vehicle and a towed vehicle.

The attainment of these and related objects may be achieved through use of the novel mirror positioning system and sensor for an automatic mirror positioning system herein disclosed. In one aspect of the invention, a mirror positioning system for a towed and a towing vehicle in accordance with this invention has a mirror pivotally mounted on a support for movement about a vertical axis. A motor is operatively connected to pivot the mirror about the vertical axis. A microprocessor is also connected to control operation of the motor. The microprocessor is configured to control the motor for oscillating the mirror in a pivoting scanning motion. A control panel is connected to enter user commands and information in the microprocessor. For example, the user may enter a command to adjust the mirror position to correct for driver's seat position adjustment, thus eliminating the need to go outside with tools to loosen and move a conventional mirror. This use of such a microprocessor command based system gives a much more flexible and convenient system than simple power adjustable mirrors.

In another aspect of the invention, at least one sensor is connected to supply input signals to the microprocessor providing information to determine an angle between the towed and towing vehicles. In one form, this sensor may be a retractable cable in a housing which is fixedly attached to the towing vehicle. An attaching means is provided to attach one end of the cable to the towed vehicle. A means for generating electrical signals representing any distance that the one end of the cable may be extended from the housing is connected to supply the electrical signals to the microprocessor. In another form, the sensor is an electromagnetic wave transmitter and receiver, one of the transmitter and receiver being mounted on the towing vehicle and the other of the transmitter and receiver being mounted on the towed vehicle. The receiver is responsive to a change of position of the transmitter relative to the receiver to generate electrical signals used to determine an angle between the towed and the towing vehicle. The receiver is connected to supply the electrical signals to the microprocessor. In a third form, the sensor comprises a pair of pickups, one positioned to sense position of the towing vehicle steering mechanism, and a second positioned to sense rotational travel of a wheel on the towing vehicle. The pickup pair are connected to provide electrical signals related to the steering mechanism position and the wheel rotational travel to the microprocessor. The microprocessor is configured to determine relative angle between the towing and towed vehicles based on these electrical signals and to so position the mirror for optimum visibility.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
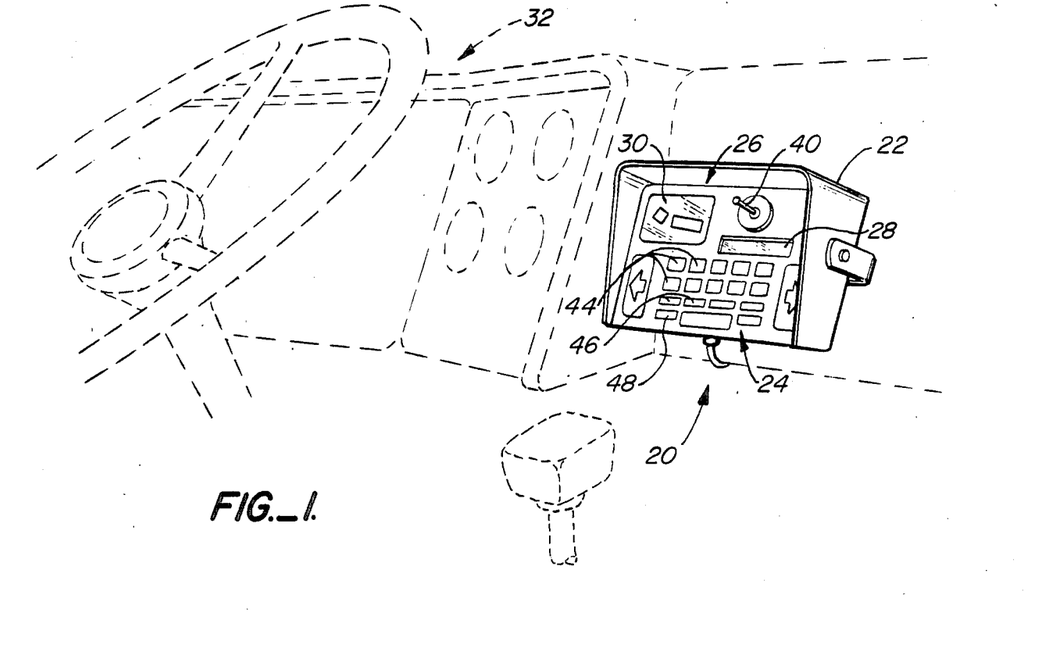
FIG. 1 is a perspective view of a portion of a mirror positioning system in accordance with the invention.
Figure 2:
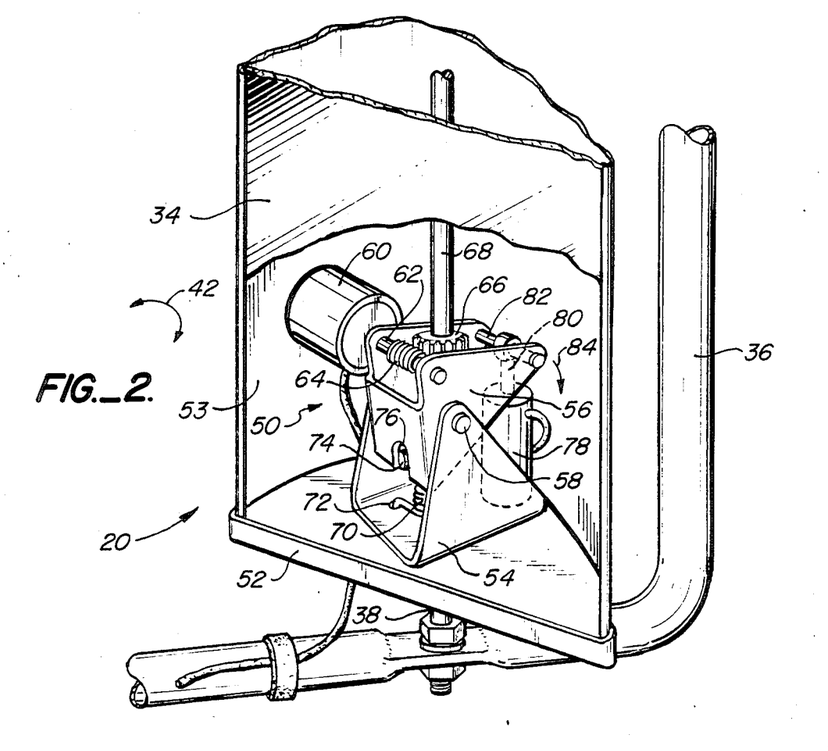
FIG. 2 is another perspective view of a different portion of the system shown in part in FIG. 1.

Turning now to the drawings, more particularly to FIGS. 1 and 2, there is shown a system 20 in accordance with the invention. The system includes a console 22, incorporating a microprocessor integrated circuit (see also FIG. 12), a control panel 24 for supplying user commands to the microprocessor and a display 26 for providing information from the microprocessor to the user. Alphanumerical display 28 shows text and number information. A second display 30 shows angular relationships between tractor 32 in which the system 20 is installed, a trailer attached to the tractor 32 and mirror 34. The mirror 34 is pivotally attached to support bracket 36 at 38. A similar pivot (not shown) is provided at the top of the mirror 34. A joystick control 40 on panel 24 allows the driver to position the mirror 34 at any point in its pivoting range, represented by arrow 42 (in FIG. 2). Keys 44 allow entry of numerical relationships, such as trailer lengths, "fifth wheel" positions, axle positions, extent of mirror oscillation and the like. Keys 46 allow choice of the relationship. Key 48 initiates oscillation of the mirror 34 over a range chosen by the keys 44 and 46.

FIG. 2 shows the mechanism 50 for pivoting the mirror 34 as shown by arrow 42. The mechanism 50 is contained within housing 52, which includes a curved back 53 and the mirror 34, constituting a front surface of the housing. The back surface 53 is shaped so that the force of air passing around the housing 52 when the tractor 32 is moving forward will tend to urge the mirror 34 into the proper position for straight ahead travel of the tractor-trailer combination. The mechanism 50 includes a first bracket 54 fixedly attached to the housing 52. A second bracket 56 is pivotally attached to the first bracket 54 at 58. Stepper motor 60 is fixedly attached to the second bracket 56 and is connected to shaft 62, rotatably mounted on the bracket 56. Worm gear 64 is mounted on the shaft 62. Worm gear 64 is positioned to engage grear 66 when bracket 56 is pivoted. Gear 66 is fixedly mounted on vertical pivoting shaft 68, which is fixedly attached to the support bracket 36 at 38. Spring 70 is connected to bracket 54 at 72 and its top is hooked around pin 74, which normally rests in notch 76 of bracket 56 when the mechanism 50 is not actuated. Pin 74 is welded to shaft 68. A solenoid 78 is attached to the bracket 56 by rods 80 and 82. When the mechanism 50 is actuated, the solenoid 78 is engaged to move rods 80 and 82 downward, pivoting the bracket 56 as indicated by arrow 84 to move pin 74 and slot 76 out of engagement and move gear 64 into engagement with gear 66. Should the system 20 become inoperative, spring 70, pin 74 and slot 76 cooperate so that the system fails to the straight ahead operation position as shown in FIG. 2.

In operation of the system 20, the driver inputs information and/or commands to cause the microprocessor in console 22 to supply suitable operating signals for the stepper motor 60 to maneuver the mirror 34 to achieve desired viewing of areas to the rear of tractor 32. Such inputs can, for example, be simply a desired position for the mirror 34. Another mode of operation is the selection of the autoscan feature with key 48, which moves the mirror back and forth across a given angle with controllable speed and distance swept, in order to view a larger or changing area while the vehicle may be stationary or moving backward or forward. This enables the driver to anticipate conditions which may be about to be encountered while leaving his or her hands free to operate the vehicle properly. In addition to the fail to normal or "zero" position, the control panel 24 also has a control selection which quickly brings the mirror back to its normal or zero position. In addition to the modes of operation discussed above, which may be carried out in a basic system without sensors for tractor-trailer relative position, the system 20 has a truly automatic mode of operation when one of the sensors discussed below in connection with FIGS. 3-13 is incorporated in the system. While the above discussion of FIGS. 1 and 2 is with respect to a left hand drive vehicle and a mirror 34 on the right side of the vehicle, the same principles apply to a left side mirror on a left hand drive vehicle, and both left and right side mirrors on a right hand drive vehicle.

Figure 3:
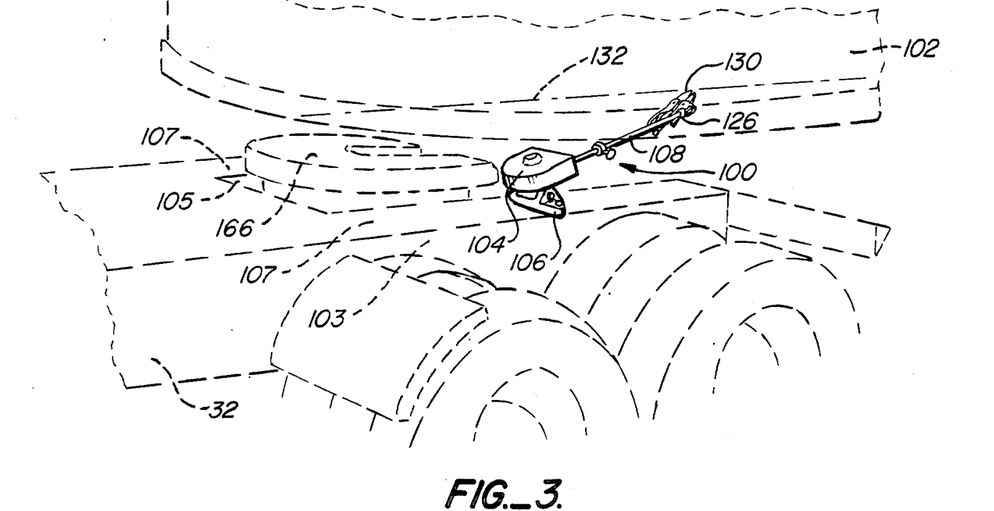
FIG. 3 is a perspective view of a sensor that may be used with the system shown in FIGS. 1 and 2.
Figure 4:
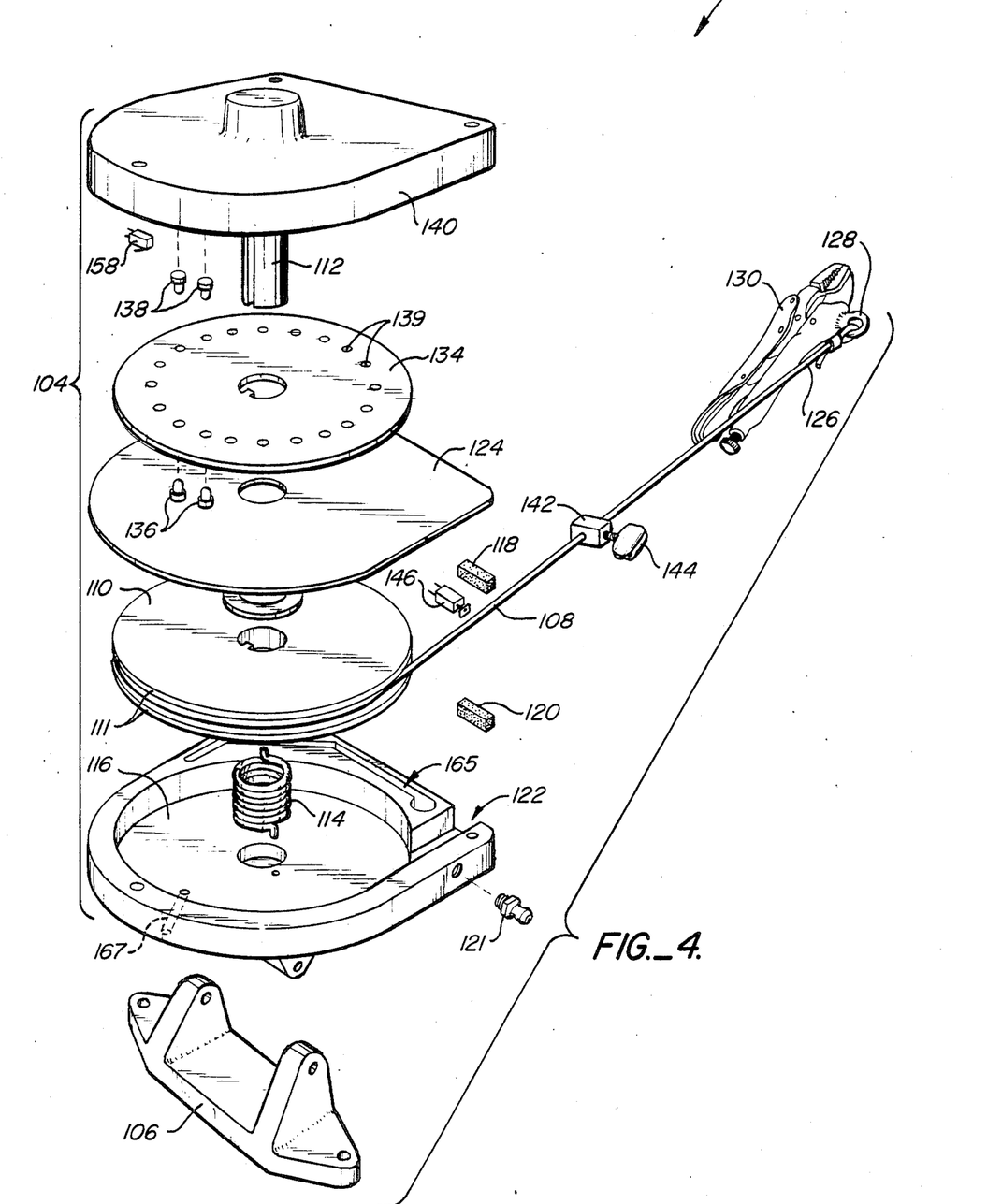
FIG. 4 is an exploded perspective view of the sensor shown in FIG. 3.

FIGS. 3 and 4 show a retractable cable sensor 100 that is connected between tractor 32 and a trailer 102. The sensor 100 has a housing 104 that is attached to the tractor 32 by means of bracket 106. Housing 104 should be mounted permanently between main frame members 103 and 105 of the tractor 32 and at least about 5 inches below their top surface 107 to be clear of the trailer kingpin when backing up under the trailer 102 to hook up. Housing 104 is pivotally attached to the bracket 106 so that housing 104 will gimbal to align itself with the extended cable 108. Cable 108 is wound on drum 110, which is mounted on rotatable shaft 112. Spring 114 is connected between the drum 110 and cover plate 116 of the housing 104. The drum 110 should have a large diameter (e.g., 1 foot) in relation to the thickness of cable 108 and has a plurality (e.g., 6) of grooves 111 in which the cable 108 is wound. This provides a large length of cable, if needed, and since each turn of winding has the same diameter, the number of turns of the drum 110 will always be consistent with a given extension of the cable 108 during turns of the tractor 32-trailer 102 combination. Felt pads 118 and 120 and a screw-in type lubrication fitting 121 for the cable 108 extending through the plate 116 to contact the felt pads 118 and 120 are provided in opening 122 defined by the cover plate 116 and middle plate 124 to lubricate the cable 108 as it passes through the opening 122. End 126 of the cable 108 is attached by ring 128 to a pair of locking pliers 130, which allow the end 126 to be conveniently attached to a part of the trailer 102, such as center girder 132, running longitudinally along the center of the trailer 102 underbody. A sensor plate 134, which rotates on shaft 112 with the drum 110, is provided on the other side of the middle plate 124 from the drum 110. A pair of light emitting diodes (LEDs) 136 are mounted on the sensor plate 134 on the other side of the plate 134 from photoelectric counters 138 mounted on cover plate 140. The plate 134 has a plurality of apertures 139 which pass over the counters 138 as the plate 134 rotates. Light from the LEDs 136 passes through the apertures 139 to strike the counters 138. The photoelectric counters are connected to supply signals indicating the number of turns of plate 134 relative to the counters 138. A movable stop 142 is attached to the cable 108 by wing nut 144 to provide slack in the cable 108 when end 126 of the cable is attached to the trailer 102, so that road motion does not affect the output of the counters 138 during operation. A switch 146 is positioned at aperture 122 to be engaged by the cable 108 when the cable is pulled taut during a turn. The switch is connected to turn on the counters 138 when engaged by the cable 108.

Figure 5A:
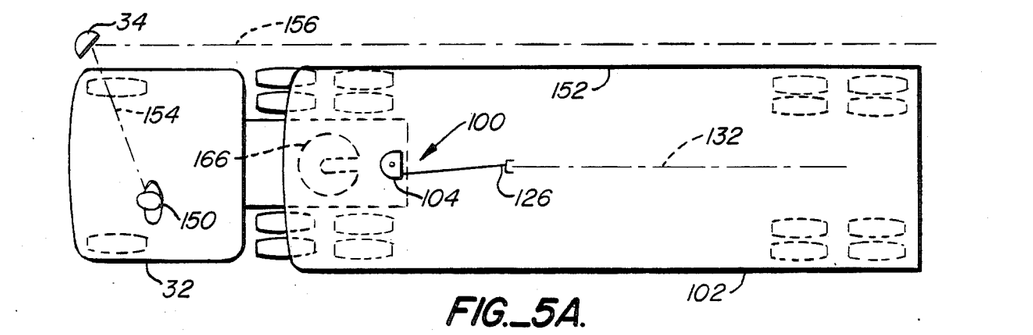
FIGS. 5A and 5B are schematic top views of a tractor-trailer combination incorporating the system of FIGS. 1 and 2 utilizing the sensor of FIGS. 3 and 4, useful for understanding operation of the system.
Figure 5B:
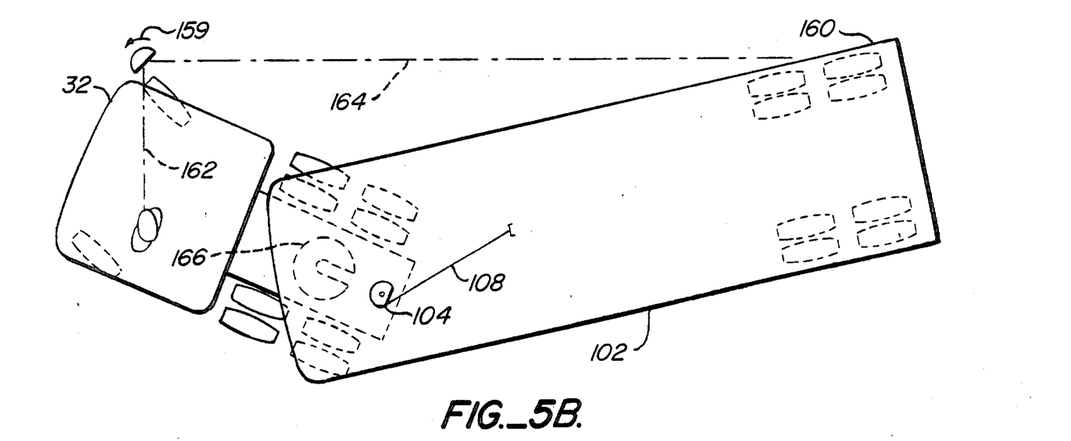

The operation of the sensor 100 will now be explained, with further reference to FIGS. 5A and 5B. FIG. 5A shows the tractor 32 and trailer 102 in straight ahead aligned relationship. The sensor 100 is in position with housing 104 mounted on the tractor 32 and end 126 of the cable 108 attached to the center girder 132 of the trailer 102. At this time, the counters 138 are not providing any signals to the microprocessor in control panel 24. Mirror 34 is therefore positioned so that driver 150 can sight along edge 152 of the trailer 102, as indicated by lines 154 and 156. FIG. 5B shows the tractor 32 and the trailer 102 during a right turn. The change in angle between the tractor 32 and the trailer 102 during the turn pulls cable 108 out of the housing 104 as the vehicles turn, thus rotating the drum 110 and the plate 134. One of the photoelectric counters 138 counts the number of holes 139 passing over the counter 138 to provide a measure of the length of the cable 108 pulled out or retracted from the housing 104, as a result of light from the LEDs 136 shining through the holes 139. The same holes 139 are counted whether the cable is pulled out or retracted, but they are counted by a different one of the counters 138. The counters 138 are separately activated by a direction sensitive switch 158 that picks up the direction of drum 110 rotation mechanically. The appropriate counter 138 sends a digital electronic signal to the microprocessor in control panel 24, which interprets the signal and transmits a control signal to the stepper motor 60 to position the mirror 34, as indicated by arrow 159 so that the driver 150 can see the area near the rear edge 160 of the trailer 102 at all times during the turn, as indicated by lines 162 and 164.

It will be appreciated that the part of cable 108 that is continually exposed to the weather does not pass through the aperture 122 into the housing 104. The normally retracted part of the cable 108 is only briefly exposed to the weather during turns. However, moisture running down the cable 108 and into the aperture 122 cannot be completely avoided and is anticipated in the construction of the housing 104. By providing drum 110 below the sensor plate 134, LEDs 136 and photoelectric counters 138, such moisture will not interfere with operation of the sensor 100. For use in severe weather and as an aid to evaporating such moisture, resistance heating elements 165 can be provided inside housing 104. A drain hole 167 through the plate 116 serves to allow the moisture to drain out of the housing 104. The drain hole 167 should be of sufficient size to allow insertion of a suitable tool periodically to unclog the hole.

The use of the sensor 100 requires only that, after having hooked up to the trailer 102 and selected the fifth-wheel 166 position, the driver pulls out the cable 108 and locking pliers 130, and attaches the pliers 130 to the girder 132 on the center of the trailer underbody, pulling the cable out approximately three (3) feet. The driver then pulls the cable 108 out a few inches more and installs the clamp 142 on the cable near the aperture to provide some slack in the line so that road motion does not affect the sensor plate 134. It will be appreciated that this operation can be normally performed in thirty (30) seconds.

The driver then enters the cab and presses a key on the control panel 24 to enter the present cable extension length as "MIN. SET" "zero" for this arrangement. At this point, to calibrate the mirrors, two procedures are possible: If the trailer size, kingpin distance, fifth-wheel position etc. are all known, the driver may enter these data in response to lighted "prompt keys" on the control panel 24 of the microprocessor. This procedure will normally suffice for most familiar arrangements. The driver may also actively calibrate the mirror position by making a full right turn of the tractor-trailer and then, using the joystick 40 on the control panel 24, position the mirror 34 to view the rear edge of the trailer, press a "MAX SET" key, thus locking those combined positions of vehicles, cable lengths, and mirrors into the memory of the microprocessor to be reproduced automatically in part or whole during future maneuvers. This active calibration procedure may also be used with other sensors, such as shown in FIGS. 6–8, 10, 12 and 13.

Figure 6:
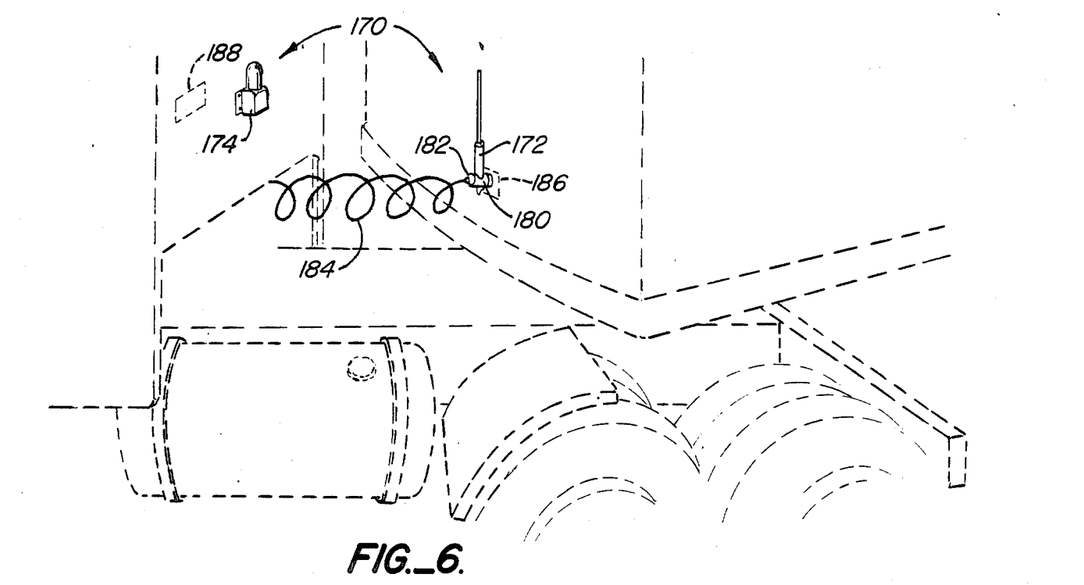
FIG. 6 is a perspective view of another sensor that may be used with the system of FIGS. 1 and 2.
Figure 7:
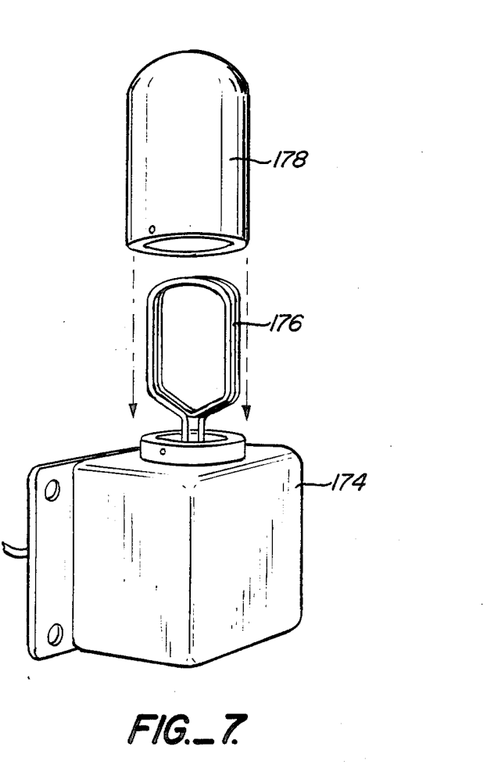
FIG. 7 is an exploded perspective view of a portion of the sensor shown in FIG. 6.
Figure 8:
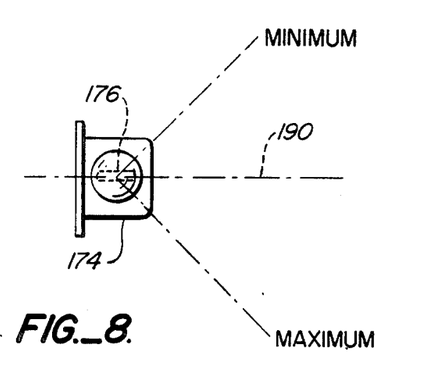
FIG. 8 is a top view of the sensor portion shown in FIG. 7.

FIGS. 6, 7 and 8 show another form of a sensor 170 that can be used with the system 20 of FIGS. 1 and 2. The sensor 170 is an adaptation of automatic direction finder (ADF) equipment used for aircraft navigation. The sensor 170 consists of a constant carrier radio frequency transmitter 172 and a receiver 174 tuned to the transmitting frequency and having a directional antenna 176 in protective housing 178. The transmitter 172 is mounted on an intermediate plug 180 that is inserted between end 182 of the electric power cord 184 and the standard receptacle 186 on the trailer 102. Power for the transmitter 172 is obtained from the tractor electric power cord 184, and the power circuits to the trailer 102 for lights and other functions are continued out the trailer side of the intermediate plug 180. In use, the driver will usually leave the transmitter 172 attached to the tractor electric power plug 182 and, when disconnecting from the trailer 102, hang the transmitter 172 on standard bracket 188 provided for the power cable 184 for safekeeping while not connected to a trailer 102. Receiver 174 may, on some vehicles, be mounted further to the left of center of the tractor to obtain a better radiating contact with transmitter 172, and/or because some trailers have receptacles 186 on the left front edge of the trailer. The above principles still obtain.

Figure 11A:
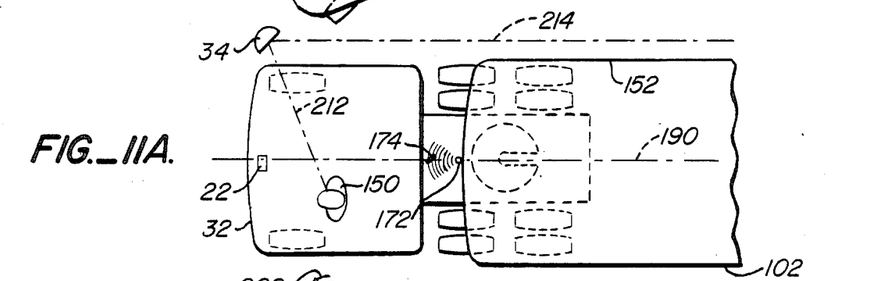

As shown in FIGS. 7 and 8, the directional antenna 176 of the receiver 174 is positioned so that the subtended angle between minimum signal strength and maximum signal strength is symmetrical about longitudinal axis 190 of the tractor 32-trailer 102 combination (see also FIG. 11A).

Figure 9:
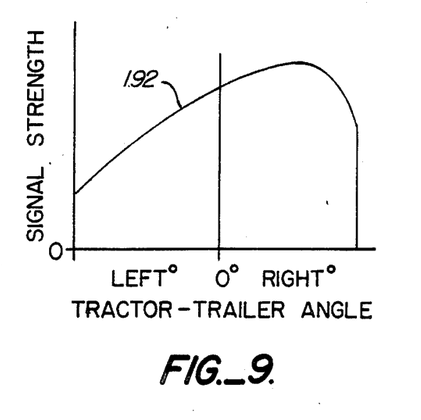
FIG. 9 is a signal waveform diagram useful for understanding operation of the sensor shown in FIGS. 6–8.

FIG. 9 shows a curve 192 representing the minimum to maximum signal strength detected by the directional antenna 176. This signal strength serves as an indication of the tractor 32-trailer 102 angle, and the receiver 174 is connected to supply the resulting signal information input to the microprocessor in console 22.

Figures 10, 11B:
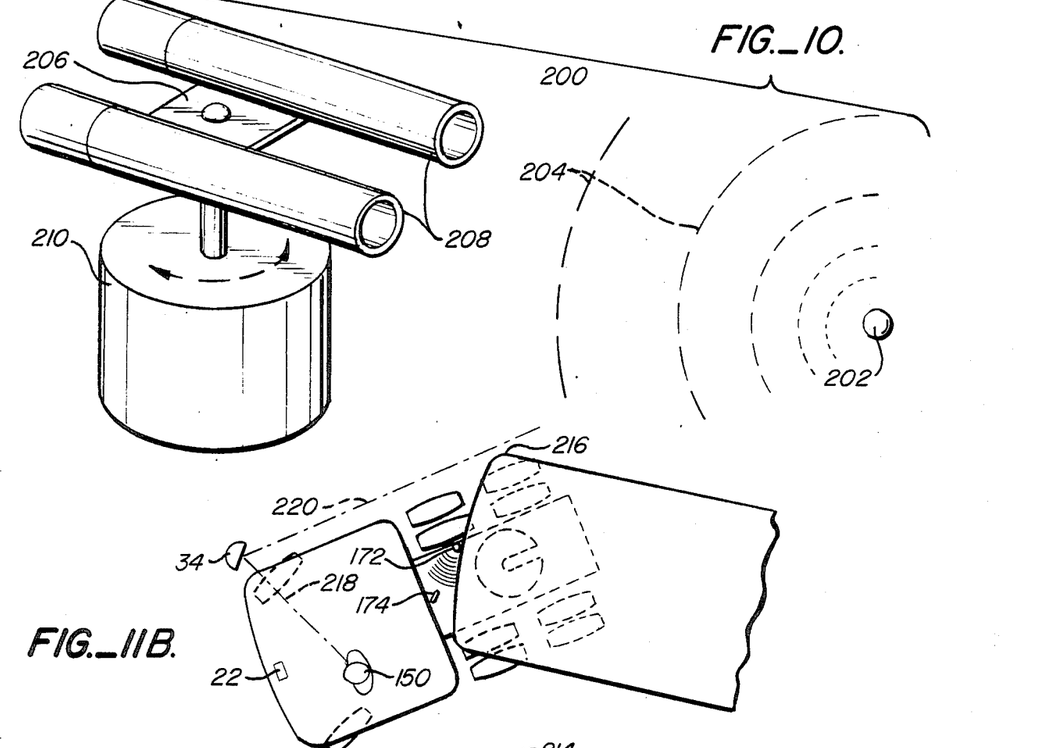
FIG. 10 is a perspective view of a third form of a sensor that may be used with the system of FIGS. 1 and 2.
FIGS. 11A, 11B and 11C are schematic top views of a tractor-trailer combination using the system of FIGS. 1 and 2 with the sensor of FIGS. 6–8 or 10, useful for a further understanding of the system operation.

FIG. 10 shows an ultrasonic sensor 200. An ultrasonic transmitter 202, which can be mounted on the trailer 102 in a similar manner to the transmitter 172 of FIG. 6, emits ultrasonic waves 204. An ultrasonic receiver 206 has a pair of hollow tube ultrasound pickups 208, which are pivotally mounted on a stepper motor 210.

In operation, stepper motor 210 pivots the hollow tube pickups 208 to be directed at the transmitter 202, so that they will receive a maximum signal. The position of the pickup 208 to receive the maximum signal will vary as the tractor 32 is oriented at different angles relative to the trailer 102. The ultrasonic receiver 206 supplies signal information indicating the resulting orientation of the pickup tubes 208 to the microprocessor in console 22, which is utilized to position the mirror 34.

Other forms of transmitters and receivers, such as infrared sensing systems, magnetic pulse sensing systems, and the like, may also be used in the automatic mirror positioning system of this invention.

Figure 11C:
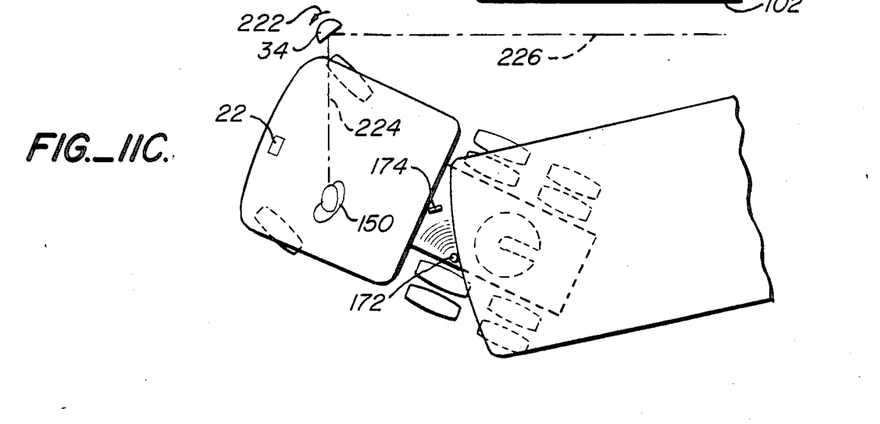

FIGS. 11A, 11B and 11C show how the sensors of FIGS. 6–8 and 10 operate to position the mirror 34 properly for rear viewing. Operation will be explained for the transmitter 172 and receiver 174 of FIG. 6, but the explanation is the same for the FIG. 10 sensor as well. When the tractor 32 and trailer 102 are in the straight ahead position, as shown in FIG. 11A, the transmitter 172 and receiver 174 are aligned along the axial center line 190 of the tractor 32-trailer 102 combination. As indicated by lines 212 and 214, the mirror 34 is positioned so that the field of vision of driver 150 is along edge 152 of the trailer 102. This orientation corresponds to the zero degree point on signal strength curve 192 in FIG. 9. For a left turn, as shown in FIG. 11B, the receiver 174 is displaced to the left relative to transmitter 172. Transmitter 174 supplies signals representing this orientation of the receiver 174 relative to transmitter 172 to the microprocessor in console 22, which processes this information to establish a desired orientation for the mirror 34. Appropriate command signals are provided to position the mirror 34 so that the line of sight of driver 150 is near corner 216 of the trailer 102, as indicated by the lines 218 and 220. The relative position shown between the tractor 32 and trailer 102 corresponds approximately to a midpoint between the zero degree intersection of signal strength curve 192 in FIG. 9 and the left edge of the curve 192.

FIG. 11C shows the tractor 32 and trailer 102 positioned for a right turn. The receiver 174 is moved to the right relative to the position of transmitter 172. Similar signal information identifying this position is supplied by the receiver 174 to the microprocessor in console 22. Appropriate command signals are supplied by the microprocessor to rotate the mirror 34 as indicated by arrow 222, so that the line of sight of driver 150 is directed by the mirror 34 to a point near the rear edge of trailer 102, as indicated by lines 224 and 226.

Figure 12:
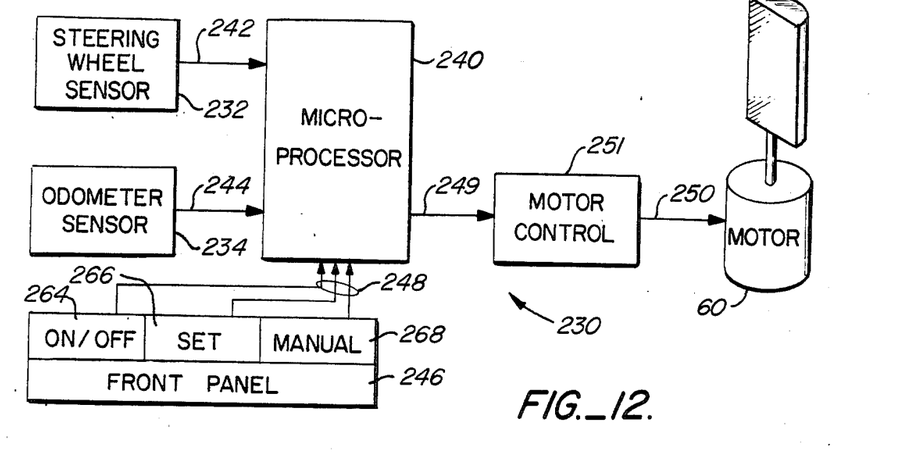
FIG. 12 is a block diagram of electronics for the system of FIGS. 1 and 2, incorporating a fourth form of a sensor.
Figures 13, 14A, 14B:
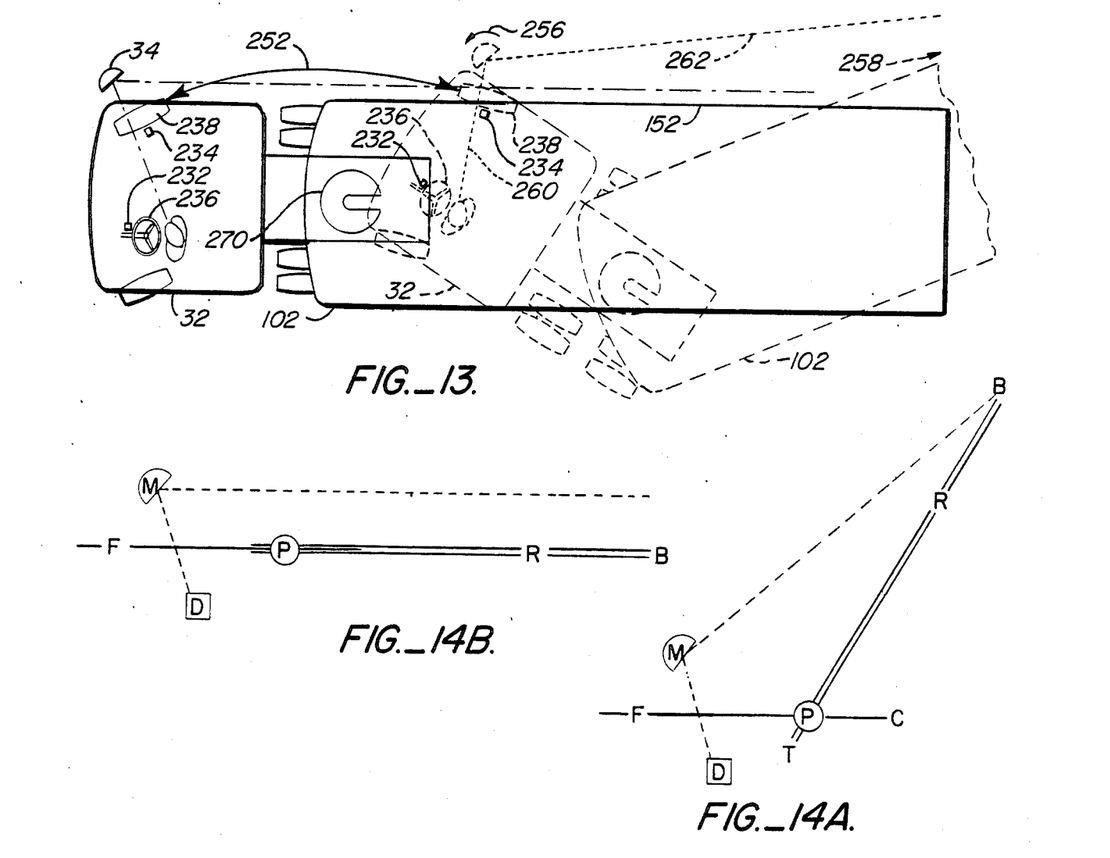
FIG. 13 is a schematic top view of a tractor-trailer combination using the system of FIG. 12, useful for understanding system operation.
FIGS. 14A and 14B is a graph of certain relationships of the tractor-trailer combination of FIG. 13, useful for a further understanding of system operation.

FIGS. 12 and 13 show another automatic mirror positioning system 230 in accordance with the invention, in which separate sensors 232 and 234 are supplied to sense turning of the steering wheel 236 and travel of wheel 238, respectively. The sensors 232 and 234 provide signal information inputs to the microprocessor 240 on lines 242 and 244, respectively. Front panel 246 is connected to the microprocessor 240 by lines 248. Stepper motor 60 is connected to the microprocessor 240 by line 250, motor control circuit 251 and line 249.

In practice, the microprocessor 240 may be implemented with a control oriented microprocessor integrated circuit, such as a COPS420 or 421 integrated circuit, obtainable from National Semiconductor Corporation, Santa Clara, Calif., one of the F387X microprocessor integrated circuit controller family, obtainable from Fairchild, Mountain View, Calif., or an Intel 8085 microprocessor, available from Intel Corporation, Santa Clara, Calif. The steering wheel sensor 232 may consist of a light reflective surface, such as a tape, affixed permanently to the lowest circular part of the base of the steering wheel hub and a photoelectric counting device mounted out of the driver's way between the dashboard and the steering wheel. The photoelectric counting device sends light over a short, shielded and direct path to reflect off the specially marked surface and to count these reflections as the steering wheel turns. The wheel 238 sensor 234 may be implemented with a magnetic pulse speedometer sensor. Such a sensor includes a magnetic pulse counter which increments every time a part of the wheel 238 passes the sensor 234. Such a sensor is available from Motorola under part numbers 4-102 and 4-700. This sensor must be able to count backward movement of the tire 238 as well.

FIG. 13 shows how the system 230 utilizes wheel 238 travel data and steering wheel 236 turning data to position the mirror 34 during a backing maneuver of the tractor 32-trailer 102 combination from an initial straight ahead orientation, to a second orientation in which the tractor 32 is turned to the right relative to the trailer 102, as shown in superimposed form on the first orientation. Movement of the tractor 32-trailer 102 combination to the second orientation, as indicated by arrow 252, results from both turning steering wheel 236 and travel of the wheel 238. The sensors 232 and 234 supply information to the microprocessor 240 on each of these movements. The information on both movements is required in order to determine the resulting angle between the tractor 32 and the trailer 102. Details on the manner in which the microprocessor 240 calculates this resulting angle are presented below in connection FIGS. 14A and 14B. Initially, the mirror 34 is positioned to sight along edge 152 of the trailer 102, as in FIGS. 5A and 11A. From the resulting angle between the tractor 32 and trailer 102, the microprocessor 240 determines the rotation of mirror 34, indicated by arrow 256, required in order to maintain the line of sight through mirror 34 near rear edge 258 of the trailer 102, as indicated by the lines 260 and 262.

ON/OFF switch 264 is used to turn power to the system 230 on and off. When the power to the system is turned off, the mirror 34 automatically returns to the normal position for straight ahead orientation of the tractor 32 and trailer 102. Turning the power off does not affect the calibration of the system 230.

The SET switch 266 is used in calibrating the system 230 for a given cab and trailer 32 configuration. A sequence of operations is performed involving movements of the steering wheel 236 and movement of the tractor 32-trailer 102 combination in conjunction with use of the set switch 266. The information gathered during this calibration sequence is stored by the microprocessor 240 in a non-volatile memory.

Manual switch 268 is used to temporarily override the automatic sensing system 230 and cause the microprocessor 240 to power the mirror 34 directly to a selected position. Power to all system components is powered from the electrical system in the cab of the tractor 32.

In order to compute the correct angle at which to set the mirror 34, it is necessary to know the length of the trailer 102 and the tractor 32 relative to the fifth wheel 270, the total movement of the steering hub when the wheels are turned from one extremity to the other, and the ratio of the number of turns of the odometer sensor to the distance traveled. The system 230 is calibrated by a process which involves the following sequence of events:

1. Turn the steering wheel 236 all the way to the left.
2. Use the SET switch 266 to indicate the start of a calibration sequence.
3. Turn the steering wheel 236 all the way to the right.
4. Use the SET switch 266 to indicate completion of the steering calibration.
5. Back up or pull forward until the trailer 32 is in the extreme right hand turn position.
6. Manually move the mirror to point to the rear corner 258 of the trailer using switch 268.
7. Use the SET switch 266 to indicate completion of the length calibration.

8. Use the SET switch 266 to indicate the type of odometer in use.

The data accumulated by this sequence of operations is stored by the microprocessor 240 in non-volatile memory.

In normal use the microprocessor 240 continuously monitors the movement of the steering hub and the odometer sensor. When it detects that right hand movement of the trailer is occurring, it uses a stored algorithm and the inputs from the calibration sequence to compute the appropriate position of the mirror 34 to track the relative movement of the trailer 102, and powers the motor 60 in the mirror 34 to move it to that position.

Whenever the trailer 102 moves back to a straight position relative to the tractor, the mirror is proportionately turned back and then power to the motor 60 and solenoid 78 (FIG. 2) is released, permitting the spring 70 (FIG. 2) to lock the mirror 34 in the normal position. When the mirror 34 power is turned off, the solenoid 78 returns to the extended position, disengages the gears 64 and 66 so that the mirror 34 is free to be returned by the spring 70 and locked into the normal position by the pin 74. This structure eliminates the need for an analog feedback sensor.

The following algorithms are used by the microprocessor 240 to calibrate the system 230 and determine the correct position at which to set the mirror 34 The state which must be input is as follows:

| POWER_ON: boolean; | {ON/OFF switch 264 position} |
|---|---|
| STEERING_MOVEMENT: integer; | {Relative motion of steering hub} |
| ODOMETER_MOVEMENT: integer; | {Relative motion of odometer} |
| MIRROR_POSITION: integer; | {Actual angle of mirror 34 to cab} |
| RIGHT_TURN_ANGLE: integer; | {Angle of mirror 34 at extreme turn} |

Normal Use—This procedure is called whenever the system 230 is turned on.

```
begin
POWER_ON := true;
while POWER_ON do
begin
read_photo_cell (STEERING_MOVEMENT);
read_photo_cell (ODOMETER_MOVEMENT);
if MIRROR_POSITION < calculated_correct_angle
then
begin
step_mirror_out;
MIRROR_POSITION := MIRROR_POSITION + 1
end
else if MIRROR_POSITION > calculated_correct_angle
then
begin
step_mirror_in;
MIRROR_POSITION := MIRROR_POSITION - 1;
end;
if MIRROR_POSITION = 0 then turn_off_mirror;
end;
end.
```

OFF_Switch_Interrupt—This procedure is called whenever the ON/OFF switch is pressed.

```
begin
POWER_ON := false;
end;
```

SET_Switch_Interrupt—This procedure is called when the SET switch is pressed to initiate a calibration sequence.

```
begin
repeat read_photo-cell (STEERING_MOVEMENT)
until set_switch_pressed;
manual_override;
RIGHT_TURN_ANGLE := MIRROR_POSITION;
end;
```

Manual_Override—This procedure is called when the MANUAL switch is pressed to override the automatic control.

```
type SWITCH_POSITION_TYPE = (RIGHT, LEFT);
var MANUAL_POSITION : SWITCH_POSITION TYPE;
begin
if MANUAL_POSITION = RIGHT then
begin
step mirror_out;
MIRROR_POSITION := MIRROR_POSITION + 1;
end
else if MANUAL_POSITION = LEFT then
begin
step_mirror_in;
MIRROR_POSITION := MIRROR_POSITION - 1;
end;
end;
```

FIGS. 14A and 14B show further relationships useful for understanding the stored algorithm used by the microprocessor 40 to calculate the required position for mirror 34. In FIG. 14, the lines c and t represent the center lines of the tractor 32 and trailer 102 respective. Points F and R represent the centers of the front and rear axle assemblies on the tractor 32 and trailer 102, respectively. Point P represents the location of the fifth wheel 270. An assumption is made for this analysis that the rear axle of the tractor 32 is in approximate alignment with the fifth wheel 270. Position D represents the driver's seat, position M is the center line of the mirror 34, and B represents edge 258 of the trailer 102.

From FIG. 14A, it can be seen that the angle D-M-B is a simple function of the relationship of line c to line t. The problem, therefore, is to compute the angle F-P-R accurately, based only on the knowledge of the fixed distance of F and R from P, and by monitoring the movement of point F relative to the rest of the system.

It should be noted that, since neither P nor R can move independently, changes in the relationship of c to t can only occur when F moves. Furthermore, since the distance F-P is fixed and since F cannot move "sideways" (fully perpendicular to line c) "forward" or "reverse" motion of F relative to line c is required in order for the relationship of c and t to change.

Forward movement of F is the simpler case. When F moves "forward" (in the direction away from P), and with simultaneous sideways movement, the angle F-P-R changes as a function of time. That is, F effectively rotates about P while R continues to move along line t. But as P moves to follow F, it also rotates around R, creating a continuum of motion. Eventually R also moves to follow P. Once the angle of movement of F to P becomes fixed, a stable condition is reached (a continuous turn). Contrary movement of F to the other side reverses this action, and restores the angle F-P-R to its original state (straightening out the trailer 102).

It should therefore be a simple matter to compute the angle F-P-R as a function of the position of the steering wheel (angle of movement of F relative to c), and the rotation of the front wheels (change with respect to time).

Backward movement is much harder to compute, because the movement of R relative to P now becomes a function not only of the relative motion of F but also of the existing angle F-P-R. For example, if the trailer 102 is already turned to the right, as shown in FIG. 14A, backward movement of F results in further movement of R to the right, and therefore steepening of the angle F-P-R. However, if the trailer 102 is already turned to the left, backward movement of F results in further movement to the left, and F-P-R increases in that direction instead. Likewise, if c and t are in direct alignment, as in FIG. 14B, backward movement of F has no effect on the angle F-P-R at all. Computing backward movement is comparable to computing forward movement, but factoring in the existing angle of lines c and t.

It should now be readily apparent to those skilled in the art that an automatic mirror rotating system capable of achieving the stated objects of the invention has been provided. The system of this invention will accurately position a mirror on a towing vehicle on the basis of relative movement between the towing vehicle and a towed vehicle for proper vision in the mirror with variations in vehicle parameters encountered in commercial hauling. The system is operable either with a variety of sensors for determining relative position of the towed and towing vehicles, in a scanning mode to move the mirror through a predetermined field of view, or in response to user positioning commands.

It should further be apparent to those skilled in the art that various changes in form and details of the invention as shown and described may be made. It is intended that such changes be included within the spirit and scope of the claims appended hereto.

What is claimed is:

1. A mirror positioning system for a towed and a towing vehicle, which comprises a mirror pivotally mounted on a support for movement about a vertical axis, a motor operatively connected to pivot said mirror about the vertical axis, a microprocessor connected to control operation of said motor, a control panel connected to enter user commands and information in said microprocessor, at least one sensor connected to supply input signals to said microprocessor providing information to determine an angle between the towed and towing vehicles, said at least one sensor comprising a retractable cable in a housing, said housing being fixedly attached to the towing vehicle, means for attaching an end of said retractable cable to the towed vehicle and means for generating electrical signals representing a distance the cable end in extended from the housing.

2. A mirror positioning system for a towed and a towing vehicle, which comprises a mirror pivotally mounted on a support for movement about a vertical axis, a motor operatively connected to pivot said mirror about the vertical axis, a microprocessor connected to control operation of said motor, a control panel connected to enter user commands and information in said microprocessor, and at least one sensor connected to supply input signals to said microprocessor providing information to determine an angle between the towed and towing vehicles, said at least one sensor comprising a wireless wave transmitter and receiver, said receiver being responsive to signals from said transmitter to generate electrical signals used to determine the angle between the towed and the towing vehicle and being connected to supply the electrical signals to said microprocessor.

3. A mirror positioning system for a towed and a towing vehicle, which comprises a mirror pivotally mounted on a support for movement about a vertical axis, a motor operatively connected to pivot said mirror about the vertical axis, a microprocessor connected to control operation of said motor, a control panel connected to enter user commands and information in said microprocessor, and at least one sensor connected to supply input signals to said microprocessor providing information to determine an angle between the towed and towing vehicles, said control panel including a display connected to receive display signals from said microprocessor and configured to show the angle between the towed and the towing vehicles as determined by said microprocessor.

4. A mirror positioning system for a towed and a towing vehicle, which comprises a mirror pivotally mounted on a support for movement about a vertical axis, a motor operatively connected to pivot said mirror about the vertical axis, a microprocessor connected to control operation of said motor, a control panel connected to enter user commands and information in said microprocessor, and at least one sensor connected to supply input signals to said microprocessor providing information to determine an angle between the towed and towing vehicles, said microprocessor is configured to oscillate said mirror in a pivoting scanning motion.

5. Apparatus for determining angular position between a towing and a towed vehicle, which comprises a housing, means for pivotally attaching said housing to the towing vehicle, a drum rotatably mounted in said housing, a flexible cable wound on said drum, said housing having an opening positioned proximate to said drum, an end of said flexible cable extending through the opening, means connected to the end of said cable for attaching the cable end to the towed vehicle, means for biasing said drum to exert retracting force on said cable, and a rotation sensor including a sensor plate connected to rotate with said drum and being positioned in said housing above said drum when said housing is attached to the towing vehicle, said sensor plate having first and second surfaces and a plurality of equally spaced openings passing between the first and second surfaces, a rotation sensing circuit including at least one light source mounted on the first surface, and at least one light sensitive counter element positioned on the second surface side of said sensor plate to be struck by light passing through the plurality of openings as said sensor plate rotates.

6. The apparatus of claim 5 additionally comprising a stop member movable along said cable to limit retraction of said cable into said housing to provide sufficient slack in said cable for accommodating road motion between the towing and towed vehicles when the cable end is attached to said towed vehicle.

7. The apparatus of claim 6 additionally comprising a switch connected to activate said rotation sensing circuit and positioned proximate to the opening in said housing to be closed when said cable is pulled taut as the towing and towed vehicles begin to turn relative to each other.

8. The apparatus of claim 5 in which one of said light sensitive counter elements is provided for each direction of rotation of said drum, and a means for sensing rotation direction is connected to activate said counter element corresponding to the sensed direction of rotation.

9. The apparatus of claim 5 in which said cable is wound on a plurality of equal diameter grooves on said drum.

10. A mirror positioning system for a towed and a towing vehicle, which comprises a mirror pivotally mounted on a support for movement about a vertical axis, a motor operatively connected to pivot said mirror about the vertical axis, a microprocessor connected to control operation of said motor, a control panel connected to enter user commmands and information is said microprocessor, and at least one sensor connected to supply input signals to said microprocessor providing information to determine an angle between the towed and towing vehicles, said at least one sensor comprising a wireless wave transmitter and receiver, one of said transmitter and receiver being mounted on the towing vehicle and another of the transmitter and receiver being mounted on the towed vehicle, said receiver being responsive to a change of position of said transmitter relative to said receiver to generate electrical signals used to determine an angle between the towed and the towing vehicle and being connected to supply the electrical signals to said microprocessor.

11. A mirror positioning system for a towed and a towing vehicle, which comprises a mirror pivotally mounted on a support for movement about a vertical axis, a motor operatively connected to pivot said mirror about the vertical axis, a microprocessor connected to control operation of said motor, a control panel connected to enter user commands and information in said microprocessor, and at least one sensor connected to supply input signals to said microprocessor providing information to determine an angle between the towed and towing vehicles, said at least one sensor comprising a first pickup responsive to positioning of a steering wheel in said towing vehicle and a second pickup responsive to rotational travel of a wheel on said towing vehicle, both said first pickup and said second pickup being connected to supply input electrical signals to said microprocessor.

12. A mirror positioning mechanism, comprising a housing with said mirror comprising a surface of said housing, said housing being pivotally mounted on a support, a first bracket fixedly attached inside said housing, a shaft fixedly attached to said support and extending into said housing, a second bracket pivotally attached to said first bracket, a motor mounted on said second bracket to apply driving force to said shaft for pivoting said housing, a biasing means connected between said first bracket and said second bracket for applying force to urge said housing to a predetermined orientation, and means for pivoting said second bracket out of engagement with said biasing means.

13. A mirror positioning system comprising the mirror positioning mechanism of claim 12, a microprocessor connected to control operation of said motor, a control panel connected to enter user commands and information in said microprocessor, and at least one sensor connected to supply input signals to said microprocessor providing information to determine an angle between the towed and towing vehicles.

14. The mirror positioning system of claim 2 in which one of said transmitter and receiver is mounted on the towing vehicle and another of the transmitter and receiver is mounted on the towed vehicle, said receiver being responsive to a change of position of said transmitter relative to said receiver to generate the electrical signals used to determine the angle between the towed and the towing vehicle.

* * * * *